United States Patent [19]

Grendol

[11] Patent Number: 4,848,893
[45] Date of Patent: Jul. 18, 1989

[54] SPECTACLE FRAME WITH LOCKABLE CUSTOM FITTING NOSEPIECE

[75] Inventor: Clark L. Grendol, Sturbridge, Mass.

[73] Assignee: American Optical Corporation, Southbridge, Mass.

[21] Appl. No.: 100,371

[22] Filed: Sep. 24, 1987

[51] Int. Cl.⁴ .............................................. G02C 5/12
[52] U.S. Cl. ..................................... 351/138; 351/88
[58] Field of Search ...................... 351/80, 88, 90, 138

[56] References Cited

U.S. PATENT DOCUMENTS

| | | |
|---|---|---|
| 1,049,822 | 1/1954 | Prat ........................................ 357/90 |
| 3,391,976 | 7/1968 | Lindblom . |
| 3,584,939 | 6/1971 | Olson et al. . |
| 4,405,214 | 9/1983 | Bolle . |
| 4,670,915 | 6/1987 | Evans . |

FOREIGN PATENT DOCUMENTS

| | | |
|---|---|---|
| 2419526 | 11/1979 | France . |
| 2472764 | 7/1981 | France . |
| 144718 | 11/1980 | German Democratic Rep. . |
| 2117919 | 10/1983 | United Kingdom . |

OTHER PUBLICATIONS

C. Grendol et al., U.S. Ser. No. 749,579 filed Jun. 27, 1985.

Primary Examiner—Rodney B. Bovernick
Attorney, Agent, or Firm—Fishman, Dionne & Cantor

[57] ABSTRACT

A spectacle assembly kit with a lockable custom fitting nosepiece is disclosed wherein a wearer is able to select an appropriately sized nosepiece, manually attach it to the spectacle frame without tools, check for correct fit, then lock the nosepiece in place permanently. Also disclosed is an alternative nosepiece attachment wherein the nosepiece is manually attached and locked to the frame in one step.

32 Claims, 1 Drawing Sheet

SPECTACLE FRAME WITH LOCKABLE CUSTOM FITTING NOSEPIECE

BACKGROUND OF THE INVENTION

This invention relates to a spectacle frame having a lockable custom fitting nosepiece and an assembly kit therefor.

There are a wide variety of spectacle frame/nosepiece combinations that have been designed to accomplish a variety of different purposes. In some cases nosepieces have been molded as part of the frame. While this avoids the need for subsequent assembly of the nosepiece to the frame, it has the disadvantage of requiring that the nosepiece and frame be made of the same material and of allowing for only one size of nosepiece per frame, unless separate frame molds are made for each nosepiece size desired.

In other cases separate nosepieces have been attached to frames in a variety of ways, some permanently and other temporarily. Nosepieces which are removable, such as clip-on types, can become detached at inopportune times, causing inconvenience to the wearer. Permanently attached nosepieces, such as those attached through adhesive, welding, soldering, fasteners, etc., require special secondary operations to make the attachment and require either a trained person or special tools or equipment. This can be cumbersome, expensive and time consuming.

It would be an advantage to provide a spectacle frame with a selection of interchangeable custom-fitting nosepieces that could be manually attached thereto without the use of tools, then permenantly locked in place after the correctness of the fit is checked.

The advantages of such a system are as follows: One frame sizes can be used with a variety of nosepiece sizes to enable that single frame to be utilized by a wide variety of wearers. The nosepiece can be made of a material different from the frame. Manual installation avoids the time, expense and equipment involved with secondary operations required by other types of attachment. The locking feature avoids inadvertent detachment of the nosepieces.

SUMMARY OF THE INVENTION

The present invention provides a spectacle frame with a lockable custom fitting nosepiece, and an assembly kit therefor, that enables the wearer to select an appropriately sized nosepiece, manually attach it to the spectacle frame without the use of tools, try on the assembled unit to check for correct fit, and then lock the nosepiece in place permanently. An alternative nosepiece attachment is also provided whereby the nosepiece is manually attached to the frame and locked in place in one step.

DETAILED DESCRIPTION OF THE PREFERRED EMBODIMENTS

Figure 1:
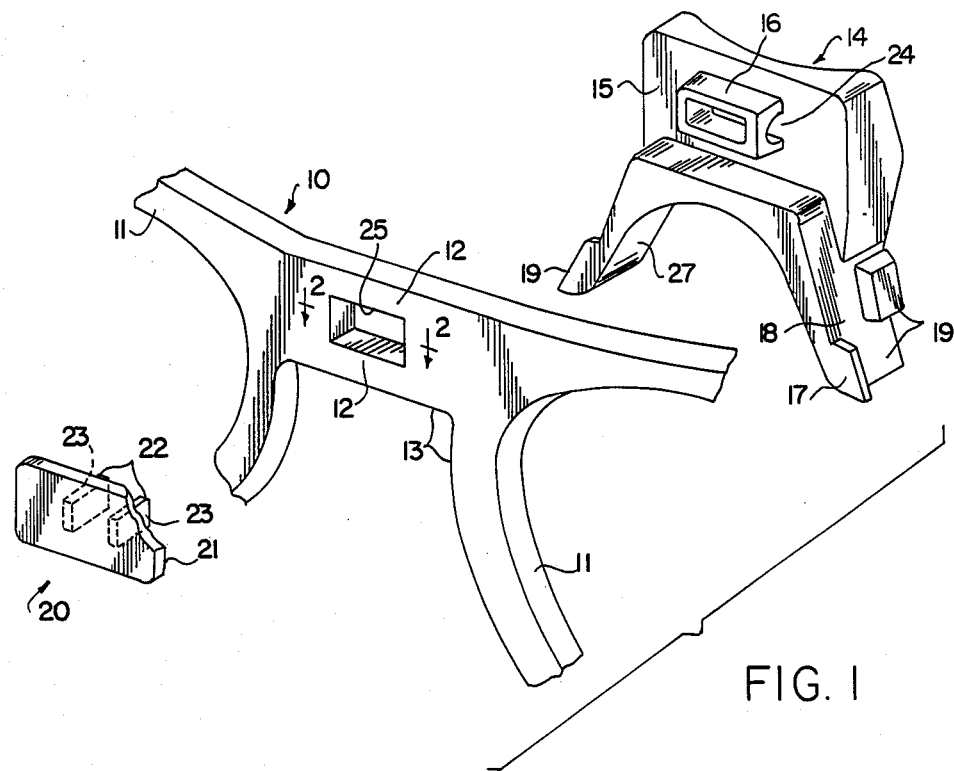
FIG. 1 is a partial front isometric view of one embodiment of the invention, illustrating the nosepiece, spectacle frame and coupling element disassembled.

The present invention comprises a spectacle frame, and an assembly kit therefor, with a lockable custom-fitting nosepiece. The frame and nosepiece may be made of any desired material and need not be the same. Preferably the frame and nosepiece will each be fabricated of a polymeric or plastic material. Advantageously the nosepiece will be available in a variety of sizes, for example small, medium and large, so that the frame can be utilized by a wide variety of wearers with different nose sizes. The nosepiece and frame are designed so that the nosepiece can be manually attached to the frame without the use of tools with a simple snap-in action. It is preferred that the nosepiece attachment be permanent, or locked in place, and this is readily accomplished through the use of a coupling element which is also designed to be manually snapped-in and matingly interlock with the nosepiece. Alternatively, the nosepiece can be locked in without the use of a separate coupling element by incorporated the locking mechanism into the nosepiece/frame attachment as will be described in detail hereinafter.

The invention will be more readily understood with reference to the above-described drawings wherein like elements are referred to by like reference numerals.

In FIG. 1 the component parts of the present invention are shown disassembled, as they would be provided in an assembly kit, for better illustrating the details of the means of attachment. Spectacle front 10 comprises two lens portions 11 interconnected by bridge portion 12. The bridge portion, which has front and rear faces, has an aperture 25 therethrough. The spectacle front embodies a nosebridge portion 13 defined by a bottom edge of the bridge portion and inner facing edges of the lens portions.

The nosepiece 14 is adapted to be snappably attached to the spectacle front 10. It comprises a bridge-abutting portion 15, which is adapted to abut the bridge portion of the spectacle front, generally against either the front or rear face thereof, and preferably against the rear face of the bridge portion. A projecting member 16 extends outwardly from the bridge-abutting portion 15 of the nosepiece and is adapted to fit within aperture 25 of the bridge portion. In the embodiment shown in FIG. 1, this projecting member is a hollow tubular member sized to snugly fit within aperture 25.

A pair of arms 17 extend downwardly from the bridge-abutting portion. These arms have inner surfaces (27) that form an approximately horseshoe shape designed to conform to the shape of a wearer's nose and outer surfaces 18 which are adapted to snuggly engage the nosebridge portion 13 of the spectacle front. A pair of ribs 19 extend normal to each of those outer surfaces 18 of arms 17 and are spaced apart a sufficient distance so as to snugly engage each lens portion 11 of the spectacle front. The snug-fitting relationship between each of the component portions of the nosepiece with the respective cooperating parts of the spectacle front, combined with the resiliency or flexibility of the parts, allows the nosepiece to be attached to the spectacle front with a snap-in action.

Once the nosepiece is attached to the spectacle front in the above manner, the wearer can try on the assembled frame and check it for proper fit. If the fit is not satisfactory, the nosepiece can easily be removed and a different one selected and snapped in place. Once the correct nosepiece has been selected and attached, it is preferable to lock it in place to give a permanent attachment so that the nosepiece is not inadvertently knocked out, such as by dropping the frame. Thus, the present invention additionally comprises means for locking the nosepiece to the spectacle front, preferably through means for locking the projecting member 16 of the nosepiece within aperture 25 of the bridge portion.

In the embodiment illustrated in FIG. 1, the locking means comprises coupling element 20 and means for interlocking the coupling element with the projecting member 16 of the nosepiece. Coupling element 20 has a bridge-abutting surface 21 which is adapted to abut one of the faces of the bridge portion 12, the face opposite the one which the bridge-abutting portion of the nosepiece abuts. Thus, after assembly the bridge portion of the spectacle front is sandwiched between the coupling element and the bridge-abutting portion of the nosepiece.

The means for interlocking the coupling element 20 to the projecting member 16 of the nosepiece can be accomplished in the following manner. A pair of prongs 22 extends normal to the bridge-abutting surface 21 of the coupling element, these prongs being spaced apart or bifurcated and capable of resilient deformation toward or away from each other. A detent portion 23 is located on each of these prongs. Projecting member 16 is a hollow tubular member adapted to receive the prongs 23 therewithin and contains detent receiving means 24, which may be holes, slots, notches etc., for engaging the detent portions 23 of the prongs. The detent portions of the prongs span a distance slightly greater than the width of the interior of the hollow tubular projecting member and approximately equal to or slightly less than the width spanning the detent receiving means 24.

Accordingly, once the nosepiece is attached to the spectacle front, with the hollow tubular projecting member 16 fitted within the aperture 25 of the bridge portion, the coupling element may be snapped into place by insertion of the prongs 22 within the hollow tubular member causing the prongs to deform toward each other until the detent portions 23 snappingly engage the detent receiving means 24, thereby allowing the prongs to return to an approximately non-deformed state and locking the prongs within said hollow tubular member. The assembled unit is illustrated, in cross-section, in FIG. 2 wherein the details of the attachment as described above are readily seen. In the embodiment shown, the nosepiece 14 fits within optional recess 26 molded into the face of the bridge portion to add further stability to the attachment, an additional advantage.

Figure 3:
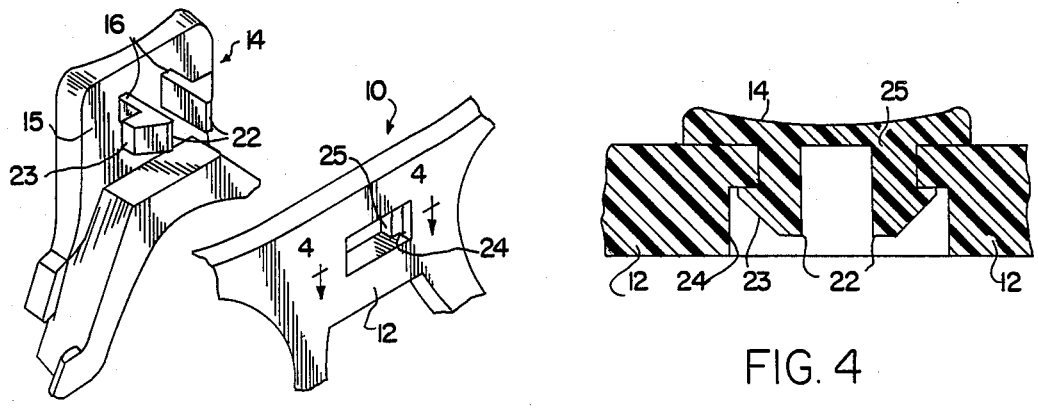
FIG. 3 is a partial front isometric view of another embodiment of the present invention illustrating the nosepiece and spectacle frame disassembled.
Figure 4:
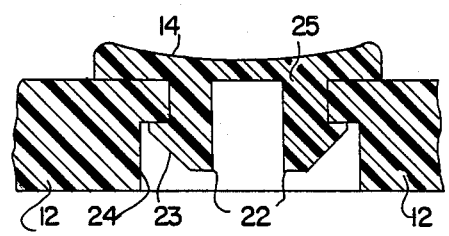
FIG. 4 is a cross-sectional view of the assembled embodiment shown in FIG. 3 taken along line 4—4.

An alternative embodiment of the present invention is illustrated in FIG. 3 and 4. In this embodiment a separate coupling element is not necessary since the locking means is incorporated in the two pieces, that is nose piece 14 and spectacle front 10.

Figure 2:
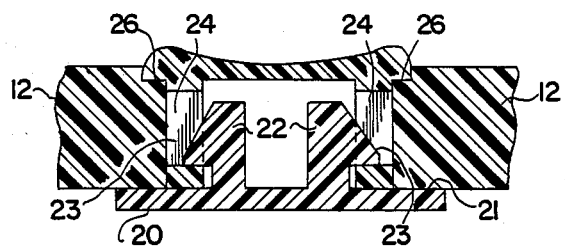
FIG. 2 is a cross-sectional view of the assembled embodiment shown in FIG. 1 taken along line 2—2.

As can be seen by comparing FIGS. 1 and 2, the nosepiece and spectacle front of this embodiment are essentially identical in most respect to their counterparts in the embodiment previously described. The difference in the two embodiments lies in the design of projecting member 16 of the nosepiece and aperture 25 of the bridge portion.

In this embodiment, the projecting member 16 of the nosepiece comprises a pair of prongs 22 spaced apart (or bifurcated) and capable of resilient deformation toward or away from each other with a detent portion 23 on each of said prongs. These detent portions are adapted to be engaged by locking means within the aperture 25. The locking means preferably comprises detent receiving means 24 within the aperture, wherein the detent receiving means are adapted to receive the detent portions 23 of the prongs upon insertion of the prongs within the aperture. As shown in FIG. 4, the detent portions 23 span a distance slightly greater than the width of the aperture 25 and approximately equal to or slightly less than the width spanning the detent receiving means 24, whereupon insertion of prongs 22 within the aperture causes the prongs to deform toward each other until the detent portions snappingly engage the detent receiving means, thereby allowing the prongs to return to an approximately non-deformed (or less deformed) state and locking the prongs within the aperture. This locks the nosepiece in place permanently, although a special tool can be used to force the prongs together and allow the nosepiece to be removed.

There are two main advantages that reside in this embodiment. First, only two components are required since the coupling element has been eliminated. And second, the detent receiving means can be readily molded into the spectacle front since it is in the mold press direction. The only disadvantage to this embodiment versus the previously disclosed embodiment, which has the coupling element, is that the wearer must be more careful in selecting the proper fitting nosepiece initially since once it is snapped in place, it cannot be removed without a special tool. In the first embodiment, the wearer can try on the assembled unit prior to inserting the coupling element which permanently locks the component parts.

The above description of the invention is illustrative only and is not intended to limit the scope of the invention which is defined by the claims which follow. It should be readily apparent that a variety of equivalent techniques and designs available to the skilled artisan may be utilized to accomplish the same inventive concept illustrated herein, including but not limited to reversing cooperating components, such as placing projecting member 16 on coupling element 20 and prongs 22 on nosepiece 14, utilizing various types of mating relationships in designing detent portions 23 and detent receiving means 24, utilizing alternative attachment designs for attaching the coupling element to the nosepiece, utilizing alternative nosepiece designs, etc.

What is claimed is:

1. A spectacle assembly kit with a lockable custom fitting nosepiece comprising
    a spectacle front comprising two lens portions interconnected by a bridge portion and embodying a nosebridge portion defined by a bottom edge of said bridge portion and inner facing edges of said lens portions, said bridge portion having an aperture completely therethrough;
    a nosepiece adapted to be snappably attached to said spectacle front comprising a bridge-abutting portion adapted to abut the bridge portion of said spectacle front, a projecting member extending outwardly and laterally from said bridge-abutting portion and adapted to fit within said aperture of said bridge portion, a pair of arms extending downwardly from said bridge-abutting portion, said arms having inner surfaces that form an approximately horseshoe shape designed to conform to the shape of a nose of a wearer, said arms having outer surfaces adapted to snuggly engage the nosebridge portion of said spectacle front, said outer surfaces of said arms each having a pair of ribs extending normal thereto and spaced apart a sufficient distance to snuggly engage each lens portion of said spectacle front; and means for locking said projecting member of said nosepiece within said aperture of said bridge portion.

2. The kit according to claim 1 wherein said locking means comprises a coupling element and means for interlocking said coupling element with said projecting member of said nosepiece.

3. The kit according to claim 2 wherein said interlocking means is designed to allow for manual, irremovable attachment of said coupling element to said projecting member without the use of tools.

4. The kit according to claim 2 wherein said bridge portion of said spectacle front has front and rear faces and said bridge-abutting portion of said nosepiece is adapted to abut one of said faces and said coupling element has a bridge-abutting surface adapted to abut the other of said faces.

5. The kit according to claim 4 wherein said interlocking means comprises a pair of bifurcated prongs extending normal to said bridge-abutting surface of said coupling element, said prongs being capable of resilient deformation, a detent portion on each of said prongs, and detent receiving means within said projecting member of said nosepiece for engaging said detent portions.

6. The kit according to claim 5 wherein said projecting member is a hollow tubular member sized to snugly fit within said aperture of said bridge portion and adapted to receive said prongs therewithin.

7. The kit according to claim 6 wherein said detent portions of said prongs span a distance slightly greater than the width of said hollow tubular member and approximately equal to or slightly less than the width spanning said detent receiving means, whereupon insertion of said prongs within said hollow tubular member causes said prongs to deform toward each other until said detent portions snappingly engage said detent receiving means, thereby allowing said prongs to return to an approximately non-deformed state and locking said prongs within said hollow tubular member of said nosepiece.

8. The kit according to claim 4 wherein said bridge-abutting portion of said nosepiece is adapted to abut the rear face of said bridge portion.

9. The kit according to claim 2 wherein said coupling element and said nosepiece are each comprised of molded plastic.

10. The kit according to claim 1 wherein said projecting member of said nosepiece comprises a pair of bifurcated prongs capable of resilient deformation with a detent portion on each of said prongs adapted to be engaged by said locking means.

11. The kit according to claim 10 wherein said locking means comprises detent receiving means within said aperture of said bridge portion, said detent receiving means adapted to receive said detent portions of said prongs upon insertion of said prongs within said aperture.

12. The kit according to claim 11 wherein said detent portions span a distance slightly greater than the width of said aperture of said bridge portion and approximately equal to or slightly less than the width spanning said detent receiving means, whereupon insertion of said prongs within said aperture causes said prongs to deform toward each other until said detent portions snappingly engage said detent receiving means, thereby allowing said prongs to return to an approximately non-deformed state and locking said prongs within said aperture.

13. The kit according to claim 10 wherein said bridge portion of said spectacle front has front and rear faces, said bridge-abutting portion of said nosepiece is adapted to abut one of said faces, and said locking means comprises a coupling element, which coupling element comprises a bridge-abutting surface adapted to abut the other of said faces of said bridge portion and an interlocking member extending normal to said bridge-abutting surface and adapted to fit within said aperture of said bridge portion and receive said detent portions of said prongs.

14. The kit according to claim 13 wherein said interlocking member comprises a hollow tubular member sized to snuggly fit within said aperture of said bridge portion and adapted to receive said prongs therewithin, and containing detent receiving means for engaging said detent portions of said prongs.

15. The kit according to claim 13 wherein said bridge-abutting portion of said nosepiece is adapted to abut the rear face of said bridge portion.

16. The kit according to claim 10 wherein said coupling element and said nosepiece are each comprised of molded plastic.

17. A spectacle frame with a lockable custom fitting nosepiece comprising a spectacle front comprising two lens portions interconnected by a bridge portion and embodying a nosebridge portion defined by a bottom edge of said bridge portion and inner facing edges of said lens portions, said bridge portion having an aperture completely therethrough;

a nosepiece snappably attached to said spectacle front comprising a bridge-abutting portion abutting the bridge portion of said spectacle front, a projecting member extending outwardly and laterally from said bridge-abutting portion and fitted within said aperture of said bridge portion, a pair of arms extending downwardly from said bridge-abutting portion, said arms having inner surfaces that form an approximately horseshoe shape designed to conform to the shape of a nose of a wearer, said arms having outer surfaces snuggly engaging the nosebridge portion of said spectacle front, said outer surfaces of said arms each having a pair of ribs extending normal thereto and spaced apart a sufficient distance to snuggly engage each lens portion of said spectacle front; and means for locking said projecting member of said nosepiece within said aperture of said bridge portion.

18. The spectacle frame according to claim 17 wherein said locking means comprises a coupling element and means for interlocking said coupling element with said projecting member of said nosepiece.

19. The spectacle frame according to claim 18 wherein said bridge portion of said spectacle front has front and rear faces and said bridge-abutting portion of said nosepiece abuts one of said faces and said coupling element has a bridge-abutting surface that abuts the other of said faces.

20. The spectacle frame according to claim 19 wherein said interlocking means comprises a pair of bifurcated prongs extending normal to said bridge-abutting surface of said coupling element, said prongs being capable of resilient deformation, a detent portion on each of said prongs, and detent receiving means within said projecting member of said nosepiece for engaging said detent portions.

21. The spectacle frame according to claim 20 wherein said projecting member is a hollow tubular member sized to snugly fit within said aperture of said bridge portion and adapted to receive said prongs therewithin.

22. The spectacle frame according to claim 21 wherein said detent portions of said prongs span a distance slightly greater than the width of said hollow tubular member and approximately equal to or slightly less than the width spanning said detent receiving means, whereupon insertion of said prongs within said hollow tubular member causes said prongs to deform toward each other until said detent portions snappingly engage said detent receiving means, thereby allowing said prongs to return to an approximately non-deformed state and locking said prongs within said hollow tubular member of said nosepiece.

23. The spectacle frame according to claim 17 wherein said projecting member of said nosepiece comprises a pair of bifurcated prongs capable of resilient deformation with a detent portion on each of said prongs adapted to be engaged by said locking means.

24. The spectacle frame according to claim 23 wherein said locking means comprises detent receiving means within said aperture of said bridge portion, said detent receiving means adapted to receive said detent portions of said prongs upon insertion of said prongs within said aperture.

25. The spectacle according to claim 24 wherein said detent portions span a distance slightly greater than the width of said aperture of said bridge portion and approximately equal to or slightly less than the width spanning said detent receiving means, whereupon insertion of said prongs within said aperture causes said prongs to deform toward each other until said detent portions snappingly engage said detent receiving means, thereby allowing said prongs to return to an approximately non-deformed state and locking said prongs within said aperture.

26. The spectacle frame according to claim 23 wherein said bridge portion of said spectacle front has front and rear faces, said bridge-abutting portion of said nosepiece abuts one of said faces, and said locking means comprises a coupling element, which coupling element comprises a bridge-abutting surface which abuts the other of said faces of said bridge portion and an interlocking member extending normal to said bridge-abutting surface fitted within said aperture of said bridge portion and receiving said detent portions of said prongs.

27. The spectacle frame according to claim 26 wherein said interlocking member comprises a hollow tubular member sized to snuggly fit within said aperture of said bridge portion and receive said prongs therewithin, and containing detent receiving means for engaging said detent portions of said prongs.

28. The spectacle frame according to claim 27 wherein said detent portions of said prongs span a distance slightly greater than the width of said hollow tubular member and approximately equal to or slightly less than the width spanning said detent receiving means, whereupon insertion of said prongs within said hollow tubular member causes said prongs to deform toward each other until said detent portions snappingly engage said detent receiving means, thereby allowing said prongs to return to an approximatley non-deformed state and locking said prongs within said hollow tubular member of said nosepiece.

29. A spectacle assembly kit with a lockable nosepiece comprising
a spectacle front comprising two lens portions interconnected by a bridge portion, said bridge portion having an aperture therethrough;
a nosepiece adapted to fit the nose of a wearer and having a projecting member extending therefrom, said projecting member adapted to fit within said aperture of said bridge portion when said nosepiece is properly positioned with respect to said spectacle front; and
a coupling element adapted to lockingly engage said projecting member within said aperture, whereby said bridge portion of said spectacle front is sandwiched between said coupling element and said workpiece.

30. The kit according to claim 29 wherein said coupling element has a pair of bifurcated prongs extending therefrom with a detent portion on each prong and said projecting member is adapted to receive said prongs therewithin and has detent receiving means for engaging said detent portions of said prongs.

31. The kit according to claim 29 wherein said projecting member comprises a pair of bifurcated prongs with a detent portion on each prong and said coupling element has an interlocking member extending therefrom adapted to fit within said aperture of said bridge portion and receive said prongs therewithin, said interlocking member having detent receiving means for engaging said detent portions of said prongs.

32. A spectacle assembly kit with a lockable nosepiece comprising
a spectacle front comprising two lens portions interconnected by a bridge portion, said bridge portion having an aperture completely therethrough;
a nosepiece adapted to fit the nose of a wearer and having a projecting member extending outwardly and laterally said projecting member adapted to fit within said aperture of said bridge portion when said nosepiece is properly positioned with respect to said spectacle front; and
a coupling element having an interlocking member extending therefrom, said interlocking member adapted to fit within said aperture of said bridge portion and matingly interlock with said projecting member of said nosepiece, whereby said bridge portion is sandwiched between said nosepiece and said coupling element.

* * * * *